United States Patent [19]

Carpenter

[11] 3,874,249

[45] Apr. 1, 1975

[54] UNITIZED WIPER SYSTEM
[75] Inventor: Keith H. Carpenter, Dayton, Ohio
[73] Assignee: General Motors Corporation, Detroit, Mich.
[22] Filed: Nov. 21, 1973
[21] Appl. No.: 417,767

[52] U.S. Cl............. 74/606, 15/250.27, 113/116 R
[51] Int. Cl............................................ F16h 57/02
[58] Field of Search ...... 74/606; 15/250.01, 250.27, 15/250.30; 113/116 R

[56] References Cited
UNITED STATES PATENTS

| | | | |
|---|---|---|---|
| 3,066,631 | 12/1962 | Geary | 113/116 R |
| 3,249,990 | 5/1966 | Schlage | 113/116 R |
| 3,455,174 | 7/1969 | Pickles | 74/606 |
| 3,793,671 | 2/1974 | Gebhard | 15/250.27 |

Primary Examiner—Wesley S. Ratliff, Jr.
Attorney, Agent, or Firm—W. A. Schuetz

[57] ABSTRACT

In a preferred form, this disclosure relates to a unitized windshield wiper assembly which is adapted to be mounted as a unit to a vehicle body. The unitized windshield wiper assembly comprises a one-piece elongated frame stamped and bent from sheet metal to form a channel-shaped support portion and to form a motor housing portion adjacent one end thereof, a first drive pivot means supported adjacent the other end of the frame, an end piece secured to the motor housing at its end remote from the first drive pivot means and which supports a second drive pivot means, an electric motor supported by the motor housing, a gear reduction means supported by the frame and drivingly connected with the electric motor, and a drive transmission means which is operatively connected to an output shaft of the gear reduction means and the drive pivots for oscillating the latter in response to rotation of the output shaft.

1 Claim, 4 Drawing Figures

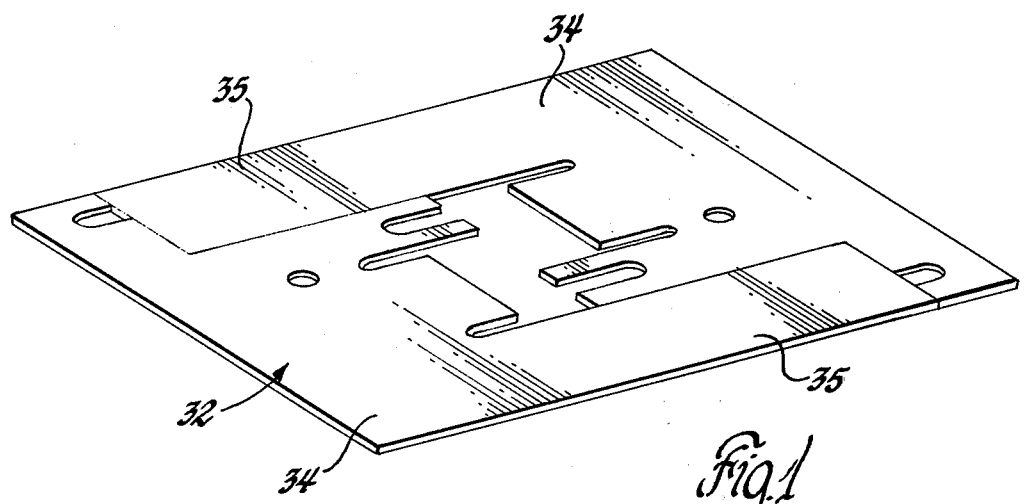
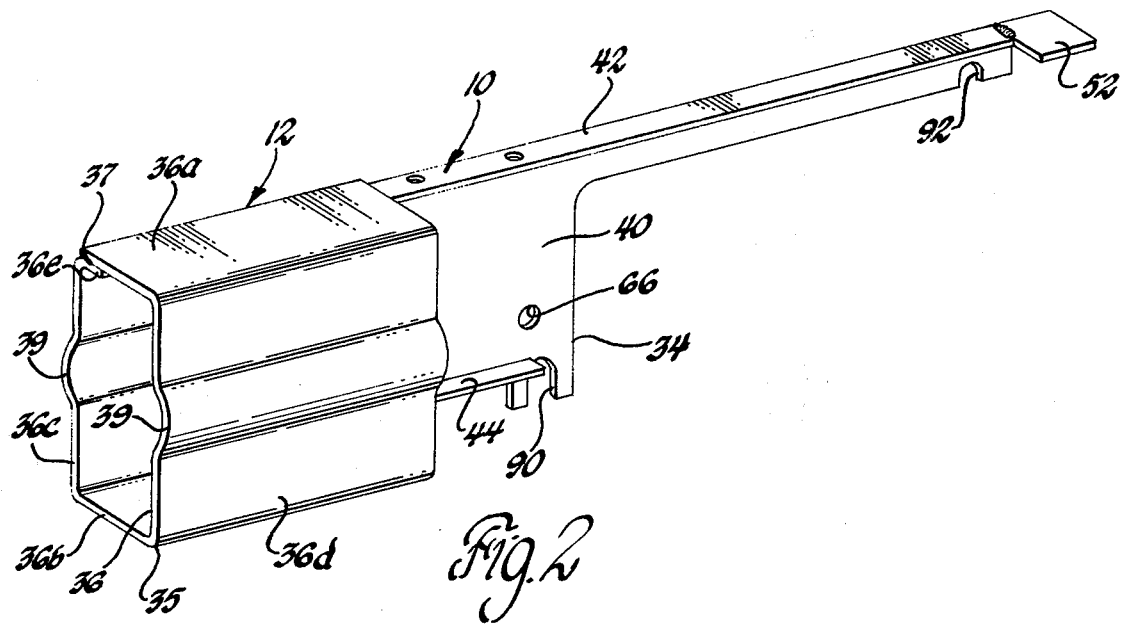

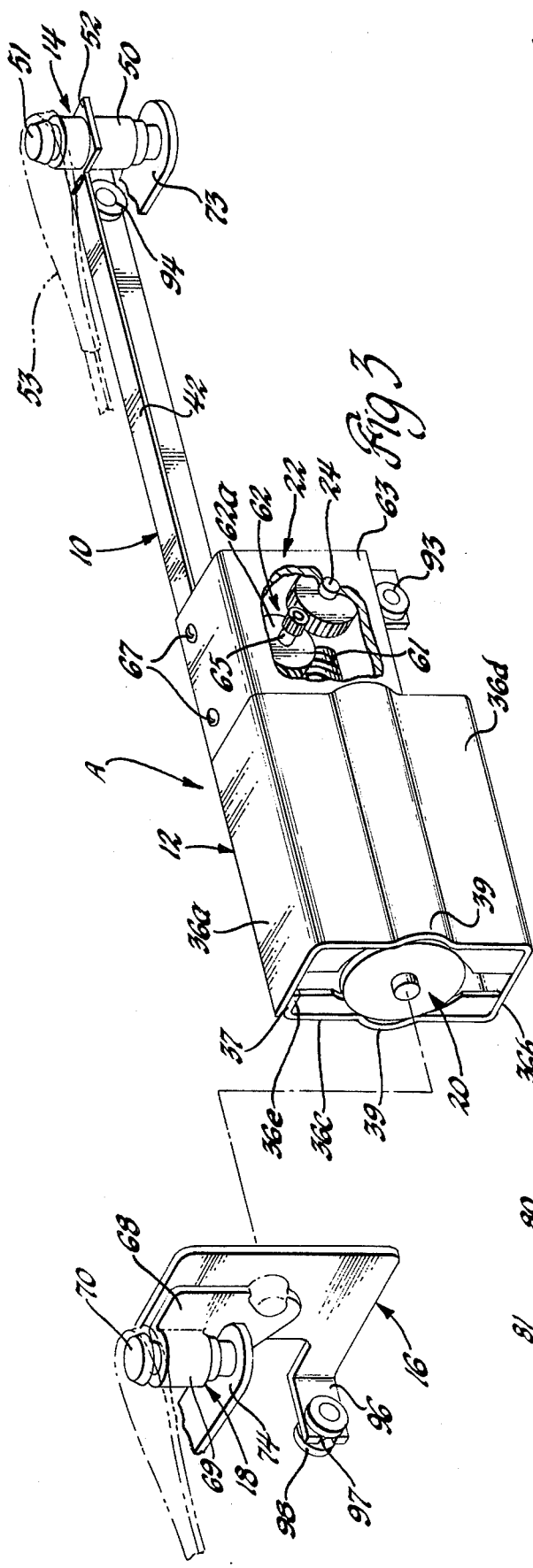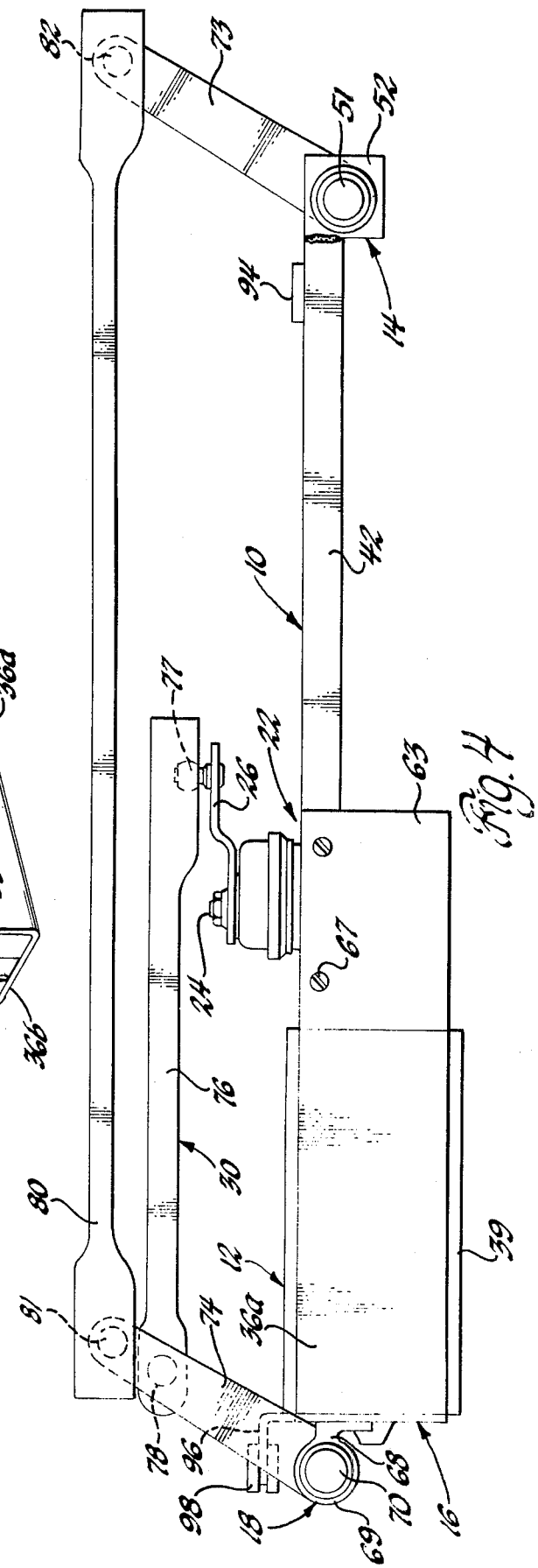

UNITIZED WIPER SYSTEM

The present invention relates to a unitized windshield wiper assembly, and in particular to a unitized windshield wiper assembly having an integral sheet metal frame and motor housing.

Heretofore, unitized windshield wiper assemblies have been provided which could be mounted as a unit to a body of an automotive vehicle. These known unitized windshield wiper assemblies have included cast metal frame parts including cast metal frame portions which provided a partial housing for an electric motor. These cast metal frame parts when connected together provided a unitized frame for supporting the drive pivots and the drive transmission of the windshield wiper assembly.

The present invention is directed to an improved unitized windshield wiper assembly in which the frame is formed by stamping and bending a sheet metal part to form an elongated channel along the major portion of the frame and to form a motor housing having a through central opening along another portion of the frame. Thus, the sheet metal frame provides the dual function of supporting a windshield wiper assembly as well as providing a housing for the electric motor to drive the windshield wiper assembly. Also, the frame is part of and supports a gear reduction unit, and since the motor and gear reduction unit support are made from the same piece, alignment between them is assured.

Accordingly, an important object of the present invention is to provide a new and improved unitized windshield wiper assembly having a frame which is formed by stamping and bending sheet metal to provide an elongated support portion and to provide a peripherally continuous housing portion for an electric motor.

Another object of the present invention is to provide a new and improved unitized windshield wiper assembly, as defined in the preceding object, in which the elongated support portion is channel shaped and in which one drive pivot is supported by the sheet metal frame adjacent one end thereof and another drive pivot is supported by an end piece secured to the motor housing whereby by varying the length of the end piece, the distance between the centerlines of the drive pivots can be varied so as to accommodate different size wiper systems for different vehicle bodies.

The advantages of the above defined unitized windshield wiper assembly are that it is of an economical construction and that the construction lends itself to be stamped from one half of a rectangularly shaped piece of sheet metal so that each rectangular sheet metal panel can be used in the production of two unitized assemblies thereby minimizing any scrap or wastage of material.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 shows a perspective view of a sheet metal panel which has been stamped and lanced to provide a pair of frame pieces for the novel unitized windshield wiper assembly of the present invention;

FIG. 2 shows one of the frame pieces of FIG. 1 stamped and bent to its final figuration;

FIG. 3 is a partial perspective view showing part of the unitized windshield wiper assembly of the present invention; and FIG. 4 is a top view of the assembled unitized windshield wiper assembly shown in FIG. 3.

The present invention provides a novel unitized windshield wiper assembly A which is adapted to be mounted as a unit to a plenum chamber or support structure (not shown) of an automotive vehicle (not shown). The unitized windshield wiper assembly A comprises an integral sheet metal frame 10 and motor housing 12, a first drive pivot means 14 supported by the frame 12 adjacent its end remote from the motor housing 12, an end piece 16 secured to the motor housing at its end remote from the first drive pivot means 14 and which rotatably supports a second drive pivot means 18, an electric motor 20 supported by the motor housing 12, a gear reduction unit 22 supported by the frame 10 and having an output shaft 24 to which a crank arm 26 is affixed, and a drive transmission means 30 operatively connected with the crank arm 26 and the drive pivot means 14 and 18 for oscillating the drive pivots 14 and 18 in response to rotation of the crank arm 26.

Referring to FIG. 1, the frame 10 and motor housing 12 is formed from flat sheet metal stock 32, preferably steel. To conserve metal, each rectangular panel 32 of sheet steel is stamped in a suitable or conventional press to provide two stamped out pieces 34 having a configuration shown in FIG. 1, and with the particular design of the frame 10 and motor housing 12 being such that two such pieces 34 can be produced from a single rectangular panel 32 of flat stock steel.

After the pieces 34 are stamped from a flat stock steel 32, as shown in FIG. 1, each piece is bent in a suitable press to the configuration shown in FIG. 2. As there shown, one end portion 35 of the stamped piece 34 is bent at spaced locations to form a substantially rectangularly shaped housing 12 which has a through central opening 36 for receiving the electric motor 20. The end portion 35 could also be bent to eccentrically accept an armature for a salient pole type motor, if desired. The housing has upper, lower and side walls 36a through 36d, respectively. The upper wall 36a of the housing extends over a flange 36e which is bent at 90° from the side wall 36c so as to provide an overlapping seam 37 which can be secured together, as by welding, to make a rigid motor housing 12. The side walls 36c and 36d are bowed outwardly intermediate their upper and lower ends, as indicated by reference numeral 39, to accommodate the electric motor when received in the housing 12.

The frame portion 10 is elongated and includes a flat bottom wall 40 and an upper flange 42 bent at right angles to the bottom portion 40 and which extends the entire length of the frame 10 along its upper side. The flange 42 is integral with the in turned flange 36e and is a continuation of the latter. The frame 10 also includes a lower flange 44 bent at right angles to the bottom 40 along its mid portion or bottom side. The flanges 42 and 44 and the bottom 40 define a channel shaped frame means which adds to the structural rigidity of the sheet metal frame as well as provides a channel in which the gear reduction unit 22 can be mounted.

The flange 42 of the frame 10 adjacent its end remote from the motor housing 12 supports the first drive pivot means 14. The drive pivot means 14 includes a stationary bearing or bushing means 50 and a rotatable drive pivot 51 which is rotatably supported by the bushing 50. The bushing 50 is suitably secured to a bracket 52, which in turn is welded to the frame 10. Alternately, the bushing could be secured directly to the frame 10. The drive pivot 51 is adapted to be secured to a wiper arm 53 of a conventional or suitable windshield wiper.

The motor housing 12 receives and supports the electric motor 20. The electric motor 20 could be of any suitable or conventional construction, such as that shown and described in U.S. Pat. No. 2,982,873, issued May 2, 1961, and assigned to the same assignee as the present invention. The electric motor 20 includes an output or armature shaft having a worm 61 at its outer end which is drivingly engaged with a gear 62a of a gear reduction train 62. The gears of the gear train 62 are rotatably supported on shafts 65 carried by a housing 63 of the gear reduction unit 22. The gear train 62 includes the output shaft 24 which extends through an opening 66 on the bottom 40 of the frame 10. The gear reduction housing 63 is suitably secured to the frame 10 via fasteners 67. Alternately, the shafts 65 for rotatably supporting the gears of the gear train 62 could have one end extend through openings in and be supported by the bottom 40 of the frame 10, if desired.

The unitized windshield wiper assembly also includes the end piece 16 which can either be of a cast metal construction or could be of a sheet metal construction and which is adapted to be secured, such as by welding, to the end of the motor housing 12 remote from the drive pivot means 14. The end piece 16 has an arm 68 which terminates in a bushing 69 for rotatably supporting a drive pivot 70, the latter two parts comprising the drive pivot means 18.

As previously noted, the crank arm 26 is adapted to be rotated about the axis of the shaft 24 in response to energization of the electric motor 20. The crank arm 26 is operatively connected with the drive pivots 14 and 18 via the drive transmission 30. The drive transmission 30 comprises a pair of crank arms 73 and 74 which have one end fixed to the drive pivots 14 and 18 adjacent their lower end, as viewed in FIGS. 3 and 4, respectively. The drive transmission 30 further includes a drive link 76 having one end connected via a ball and socket joint 77 to the crank arm 26 and the other end connected via a ball and socket joint 78 to the crank arm 74 intermediate its ends. A follower link 80 having one end pivotally connected via a ball and socket joint 81 to the outer end of the crank arm 74 and its other end connected via ball and socket joint 82 to crank arm 73 at the outer end of the latter is provided.

From the foregoing, it should be apparent that rotation of the crank arm 26 causes the drive link 76 to be reciprocated back and forth which in turn causes the crank arms 73 and 74 to be oscillated back and forth. Oscillation of the crank arms 73 and 74 causes the drive pivots 14 and 18 to be oscillated back and forth. The drive pivots 14 and 18 are connectable to a pair of windshield wiper arms 53 and the oscillation of the drive pivots 14 and 18 causes the wipers 53 to be oscillated in tandem across an outer surface of the windshield between inboard and outboard positions and to be parked at the inboard position.

To enable the unitized windshield wiper assembly to be mounted as a unit to a body of a vehicle, the support frame 40 is provided with slots or openings 90 and 92 which receive grommets 93 and 94 through which a fastener (not shown) can extend to fasten the frame 10 against the vehicle body. Likewise, the end piece includes a bracket or leg 96 having an opening 97 for receiving a grommet 98 through which a fastener can be received.

From the foregoing, it should be apparent that a novel unitized windshield wiper assembly in which at least a major portion of the frame 10 is made from sheet metal including the motor housing 12 has been provided. This type of unitized frame is of an economical construction. Additionally, it should be noted that the center line distances between the axis of the drive pivots 14 and 18 can be varied by using different length end pieces while utilizing the same integral frame 10 and motor housing 12. This enables the unitized system to be readily adapted to different vehicle bodies.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A unitized windshield wiper assembly adapted to be mounted as a unit to a vehicle body comprising: a one-piece elongated frame having a motor housing portion adjacent one end thereof; a first drive pivot means supported adjacent the other end of the frame, an end piece secured to the motor housing portion at the end remote from the first drive pivot means, said end piece supporting a second drive pivot means; an electric motor supported by said motor housing portion; a gear reduction means supported by said frame and drivingly connected with the electric motor, said gear reduction means including an output shaft, a crank arm fixed to said output shaft, a drive transmission means operatively connected to said crank arm and said first and second drive pivot means for oscillating the latter in response to rotation of the crank arm, and spaced mounting openings on said frame and an end piece to enable the same to be mounted to the vehicle via fasteners, the improvement being that said frame including the motor housing portion is made from a single piece sheet metal which is stamped and bent to form a generally L-shaped side wall having a thin narrow arm to which the first drive pivot means is supported at the outer end thereof and a wide rectangular base leg, a reversely bent upper flange extending along substantially the entire upper edge of the side wall and providing structural rigidity therefor, a rectangular section extending from the end of the base leg at the lower end thereof and bent to form a peripherally continuous motor housing portion having a central through opening for receiving the electric motor adjacent an end portion thereof with an upper wall reversely bent and overlapping the flange, and a second flange along the lower edge of the base leg intermediate the rectangular section and the narrow arm to provide lower structural rigidity for the frame.

* * * * *